United States Patent
Lu et al.

(10) Patent No.: US 12,155,427 B2
(45) Date of Patent: Nov. 26, 2024

(54) METHOD AND SYSTEM FOR ACQUIRING MASSIVE MIMO BEAM DOMAIN STATISTICAL CHANNEL INFORMATION

(71) Applicant: Southeast University, Jiangsu (CN)

(72) Inventors: Anan Lu, Jiangsu (CN); Xiqi Gao, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 68 days.

(21) Appl. No.: 17/762,195

(22) PCT Filed: Apr. 22, 2020

(86) PCT No.: PCT/CN2020/086181
§ 371 (c)(1),
(2) Date: Mar. 21, 2022

(87) PCT Pub. No.: WO2021/109420
PCT Pub. Date: Jun. 10, 2021

(65) Prior Publication Data
US 2022/0393730 A1   Dec. 8, 2022

(30) Foreign Application Priority Data

Dec. 5, 2019   (CN) .......................... 201911232190.9

(51) Int. Cl.
*H04B 7/04* (2017.01)
*H04B 7/0456* (2017.01)
(Continued)

(52) U.S. Cl.
CPC ........... *H04B 7/0456* (2013.01); *H04B 7/088* (2013.01); *H04B 17/391* (2015.01); *H04L 25/024* (2013.01)

(58) Field of Classification Search
CPC .... H04B 7/0456; H04B 17/391; H04B 7/088; H04L 25/024
See application file for complete search history.

(56) References Cited

U.S. PATENT DOCUMENTS

| | | | |
|---|---|---|---|
| 2007/0207730 A1 | 9/2007 | Nguyen | |
| 2009/0058724 A1* | 3/2009 | Xia | ...................... H01Q 3/2605 342/368 |

(Continued)

FOREIGN PATENT DOCUMENTS

| | | |
|---|---|---|
| CN | 101953099 A | 1/2011 |
| CN | 102638424 A | 8/2012 |
| CN | 107431521 A | 12/2017 |

OTHER PUBLICATIONS

Wang, Haiming et al., "Efficient joint estimation of fine timing and channel impulse response for wideband wireless channels", Chinese Journal of Radio Science, vol. 29, No. 5, Oct. 31, 2014, pp. 793-798 . . . .

*Primary Examiner* — Freshteh N Aghdam
(74) *Attorney, Agent, or Firm* — MUNCY, GEISSLER, OLDS & LOWE, P.C.

(57) ABSTRACT

Disclosed are a method and system for acquiring massive MIMO beam domain statistical channel information. A refined beam domain channel model involved in the disclosed method is based on a refined sampling steering vector matrix. Compared with a traditional DFT matrix-based beam domain channel model, when antenna size is limited, said model is closer to a physical channel model, and provides a model basis for solving the problem of the universality of massive MIMO for various typical mobile scenarios under a constraint on antenna size. The present invention provides a method for acquiring massive MIMO refined beam domain a priori statistical channel information and a posteriori statistical channel information, the a poste- (Continued)

riori statistical channel information comprising mean and variance information of the a posteriori channel. The method of the present invention has low complexity, can be applied to an actual massive MIMO system, provides support for a robust precoding transmission method, and has large application value.

14 Claims, 3 Drawing Sheets

(51) Int. Cl.
*H04B 7/08* (2006.01)
*H04B 17/391* (2015.01)
*H04L 25/02* (2006.01)

(56) References Cited

U.S. PATENT DOCUMENTS

| | | | |
|---|---|---|---|
| 2010/0159845 A1* | 6/2010 | Kaaja | H04W 48/14 455/70 |
| 2010/0164802 A1* | 7/2010 | Li | H01Q 1/246 342/368 |
| 2010/0164805 A1* | 7/2010 | Niu | H01Q 3/30 342/377 |
| 2012/0040629 A1* | 2/2012 | Li | H01Q 3/30 455/91 |
| 2021/0058117 A1* | 2/2021 | Ho | H04B 7/065 |

\* cited by examiner

METHOD AND SYSTEM FOR ACQUIRING MASSIVE MIMO BEAM DOMAIN STATISTICAL CHANNEL INFORMATION

TECHNICAL FIELD

The present invention relates to the field of communications technologies, and more particularly relates to a method and system for acquiring massive Multiple-Input Multiple-Output (MIMO) beam domain statistical channel information.

BACKGROUND

In order to improve user experience and cope with the rapid growth in demand for wireless data services and the challenges brought by new service requirements, the future new-generation mobile network needs to support higher quality, higher transmission rate, higher mobility, higher user density, lower latency, lower energy consumption, and other scenarios. In recent years, to significantly improve the spectral efficiency and power efficiency of the wireless spectrum, massive MIMO technology is widely studied. Currently, the massive MIMO has been identified as one of the key technologies for 5G. The massive MIMO greatly increases the system capacity and fully utilizes the spatial dimension resources by equipping a base station (BS) with a large-scale antenna array; and remains a research hotspot for Beyond 5G (B5G) in the future.

The establishment of a channel statistical model is the basis of a theoretical method of massive MIMO precoding transmission. In the documents, a common channel statistical model is a conventional beam domain channel model based on a discrete Fourier transform (DFT) matrix. However, in an actual massive MIMO wireless system, the limited antenna size limits the application of large-scale linear array antennas. The BS side is often equipped with an easy-to-implement antenna array such as a large-scale planar array antenna, leading to a limited number of antennas in a single dimension. Under such a limitation, the use of the conventional DFT matrix-based beam domain channel model for approximation of the same eigen-mode matrices in a single dimension of all user channels may deviate from an actual physical channel model to a considerable extent. On the other hand, the BS is equipped with large-scale antenna arrays in the massive MIMO wireless system, and the number of user antennas that occupy the same time-frequency resources increases, limiting the time-frequency resources for pilots. Errors in instantaneous channel estimation cannot be avoided in the case of limited pilot resources, and moreover, there are factors such as aging of the instantaneous channel information acquired at the BS side in the medium and high-speed mobile communication scenarios. Therefore, it is of great significance to develop a statistical channel model that can describe various typical mobile communication scenarios. The related work in the documents mostly considers large-scale linear array antennas, and uses the DFT matrix to convert a spatial signal into a sparse angle domain signal; but none considers a posteriori statistical model based on a priori statistical model and the instantaneous channel information.

In the massive MIMO wireless transmission system, a downlink multi-user precoding transmission method is the key to combating multi-user interference and achieving a spectral efficiency gain, thus being one of the core issues in the massive MIMO wireless transmission system. In an actual massive MIMO system, the mobility of users poses significant challenges for the downlink multi-user precoding transmission method. To solve this problem, a robust multi-user precoding transmission method becomes increasingly important. For the robust transmission method, methods based on the statistical channel model are a class of key methods, and the acquisition of statistical channel information is the basis of the methods based on the statistical channel model. Therefore, it is of great importance to acquire the statistical channel information of a new model during extension of the conventional DFT matrix-based beam domain channel model.

SUMMARY

Invention objective: In view of the shortcomings in the prior art, the present invention aims to provide a method and system for acquiring massive MIMO beam domain statistical channel information, which can provide support for a massive MIMO robust precoding transmission method.

Technical solution: To achieve the foregoing objective, the present invention provides the following technical solutions:

A method for acquiring massive MIMO beam domain a priori statistical channel information is provided, which includes the following steps:
  receiving pilot signals sent by different user terminals;
  respectively multiplying the received pilot signals and pre-stored pilot signals of the users;
  transforming the multiplied pilot signals to a refined beam domain by means of a refined sampling steering vector matrix, where the number of steering vectors in the refined sampling steering vector matrix is greater than the number of corresponding antennas; and
  acquiring refined beam domain a priori statistical channel information of the user terminals by using refined beam domain sampling statistics.

Further, the multiplied pilot signals are transformed into the refined beam domain by means of premultiplication by a conjugate matrix of the refined sampling steering vector matrix at the sending side and postmultiplication by a conjugate matrix of the refined sampling steering vector matrix at the receiving side.

Further, the user terminals send the pilot signals on the same time-frequency resource, and the pilot signals of the different user terminals are mutually orthogonal.

Further, the step of acquiring the refined beam domain a priori statistical channel information of the user terminals by using the refined beam domain sampling statistics is specifically: solving a channel energy matrix by using an equation regarding the refined beam domain sampling statistics and a function matrix of the channel energy matrix, where only the channel energy matrix or a channel amplitude matrix is an unknown matrix in the equation, and other matrices are known matrices.

A method for acquiring massive MIMO beam domain a priori statistical channel information is provided, which includes the following steps:
  acquiring channel information of different user terminals;
  transforming the channel information of the user terminals to a refined beam domain by conversion by means of a refined sampling steering vector matrix, where the number of steering vectors in the refined sampling steering vector matrix is greater than the number of corresponding antennas; and
  acquiring refined beam domain a priori statistical channel information of the user terminals by using refined beam domain sampling statistics.

Further, the channel information is transferred to the refined beam domain by conversion by means of premultiplication by a conjugate matrix of the refined sampling steering vector matrix at the sending side and postmultiplication by a conjugate matrix of the refined sampling steering vector matrix at the receiving side.

Further, the step of acquiring the refined beam domain a priori statistical channel information of the user terminals by using the refined beam domain sampling statistics is specifically: solving a channel energy matrix by using an equation regarding the refined beam domain sampling statistics and a function matrix of the channel energy matrix, where only the channel energy matrix or a channel amplitude matrix is an unknown matrix in the equation, and other matrices are known matrices.

A method for acquiring massive MIMO beam domain a posteriori statistical channel information is provided, which includes the following steps:

acquiring refined beam domain a priori statistical channel information of user terminals before a current time slot by using the foregoing method for acquiring massive MIMO beam domain a priori statistical channel information;

acquiring pilot signals sent by the user terminals at the current time slot; and estimating a refined beam domain channel matrix by using the received pilot signals, and acquiring refined beam domain a posteriori statistical channel information of the user terminals according to the refined beam domain a priori statistical channel information and correlation factors between channels.

Further, the refined beam domain a posteriori statistical channel information includes a refined beam domain a posteriori mean and a refined beam domain a posteriori variance.

A computing device is provided, which includes a memory, a processor, and a computer program stored in the memory and running on the processor, where when loaded to the processor, the computer program implements the method for acquiring the massive MIMO beam domain a priori statistical channel information or the method for acquiring the massive MIMO beam domain a posteriori statistical channel information.

A massive MIMO communication system is provided, which includes a BS and a plurality of user terminals, where the BS is used for:

receiving pilot signals sent by the different user terminals; respectively multiplying the received pilot signals and pre-stored pilot signals of the users; transforming the multiplied pilot signals to a refined beam domain by conversion by means of multiplication by a refined sampling steering vector matrix, where the number of steering vectors in the refined sampling steering vector matrix is greater than the number of BS antennas; and acquiring refined beam domain a priori statistical channel information of the user terminals by using refined beam domain sampling statistics; or acquiring channel information of the different user terminals; transforming the channel information of the user terminals to a refined beam domain by conversion by means of multiplication by a refined sampling steering vector matrix, where the number of steering vectors in the refined sampling steering vector matrix is greater than the number of BS antennas; and acquiring refined beam domain a priori statistical channel information of the user terminals by using refined beam domain sampling statistics.

A massive MIMO communication system is provided, which includes a BS and a plurality of user terminals, where the BS is used for:

acquiring refined beam domain a priori statistical channel information of the user terminals before a current time slot by using the foregoing method for acquiring the massive MIMO beam domain a priori statistical channel information;

acquiring pilot signals sent by the user terminals at the current time slot; and estimating a refined beam domain channel matrix by using the received pilot signals, and acquiring refined beam domain a posteriori statistical channel information of the user terminals according to the refined beam domain a priori statistical channel information and correlation factors between channels.

A massive MIMO communication system is provided, which includes a BS and a plurality of user terminals, where the BS is disposed with the foregoing computing device.

Beneficial effects: Compared to the prior art, the methods for acquiring massive MIMO beam domain a priori and a posteriori statistical channel information provided by the present invention can establish a statistical model for various typical mobile scenarios in a massive MIMO system, and can provide effective support for implementation of a robust precoding transmission method in the massive MIMO system, thus solving the problem of universality of massive MIMO for various typical mobile scenarios.

DETAILED DESCRIPTION OF THE EMBODIMENTS

The technical solution provided by the present invention will be described in detail below with reference to specific embodiments. It should be understood that the following specific embodiments are only used to illustrate the present invention and not intended to limit the scope of the present invention.

Figure 1:
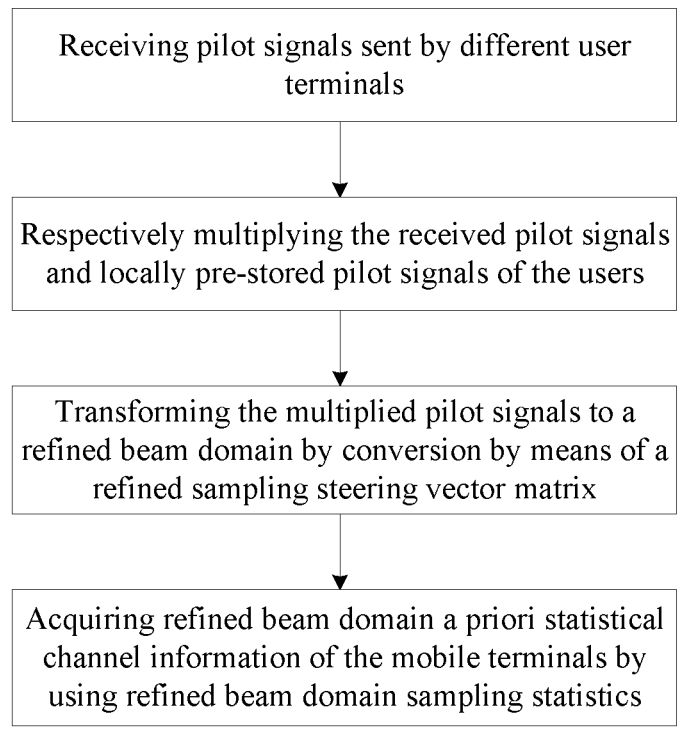
FIG. 1 is a flowchart of a method for acquiring massive MIMO beam domain a priori statistical channel information.

As shown in FIG. 1, a method for acquiring massive MIMO beam domain a priori statistical channel information disclosed in an embodiment of the present invention includes the following steps: receiving pilot signals sent by different user terminals; respectively multiplying the received pilot signals and locally pre-stored pilot signals of the users; transforming the multiplied pilot signals to a refined beam domain by conversion by means of a refined sampling steering vector matrix; and acquiring refined beam domain a priori statistical channel information of the mobile terminals by using refined beam domain sampling statistics.

Figure 2:
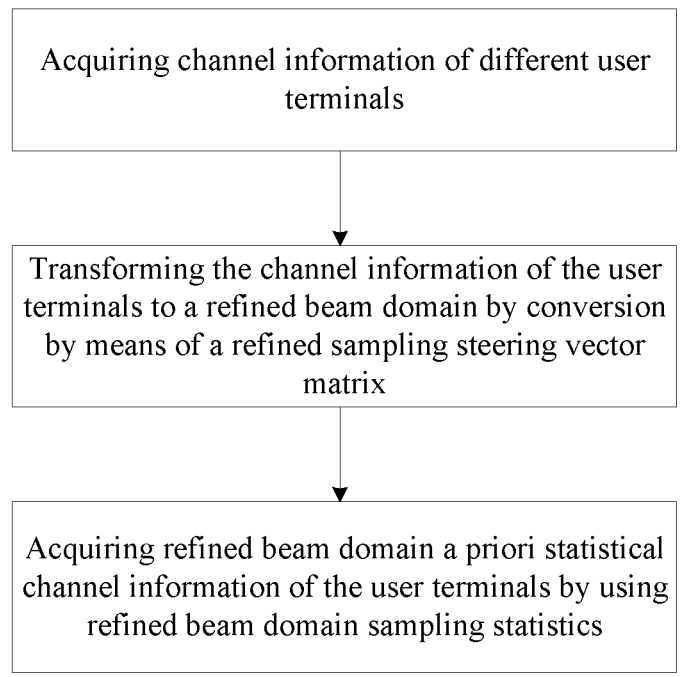
FIG. 2 is a flowchart of a method for acquiring massive MIMO beam domain a priori statistical channel information in the case of known instantaneous channel information.

As shown in FIG. 2, a method for acquiring massive MIMO beam domain a priori statistical channel information disclosed in another embodiment of the present invention is a method for acquiring the massive MIMO beam domain a priori statistical channel information in the case of known instantaneous channel information, which includes the following steps: acquiring channel information of different user terminals; transforming the channel information of the user terminals to a refined beam domain by conversion by means of a refined sampling steering vector matrix; and acquiring refined beam domain a priori statistical channel information of the user terminals by using refined beam domain sampling statistics.

Figure 3:
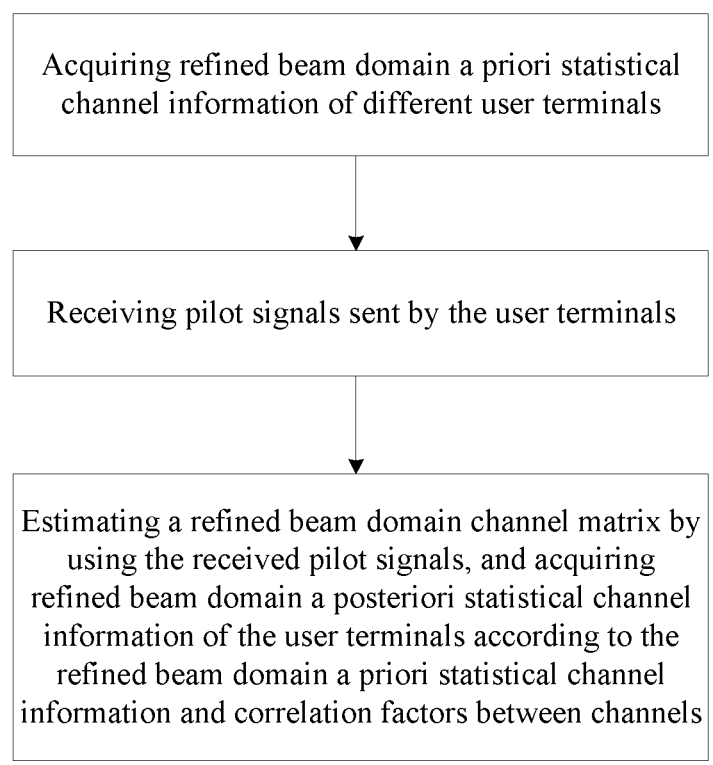
FIG. 3 is a flowchart of a method for acquiring massive MIMO beam domain a posteriori statistical channel information.

As shown in FIG. 3, a method for acquiring massive MIMO beam domain a posteriori statistical channel information disclosed in an embodiment of the present invention includes the following steps: acquiring refined beam domain a priori statistical channel information of different user terminals before a current time slot; acquiring pilot signals sent by the user terminals at the current time slot; estimating a refined beam domain channel matrix by using the received pilot signals, and acquiring refined beam domain a posteriori statistical channel information of the user terminals according to the refined beam domain a priori statistical channel information and correlation factors between channels.

The user terminals in the foregoing embodiments may be mobile phones, vehicle-mounted devices, intelligent equipment, or other mobile terminals or fixed terminals. The pilot signals or the channel information may be transferred to the refined beam domain by conversion by means of premultiplication by a conjugate matrix of the refined sampling steering vector matrix at the sending side and postmultiplication by a conjugate matrix of the refined sampling steering vector matrix at the receiving side, where the number of steering vectors in the refined sampling steering vector matrix is greater than the number of corresponding antennas. During the acquisition of the refined beam domain a priori statistical channel information, a channel energy matrix may be solved by using an equation regarding the refined beam domain sampling statistics and a function matrix of the channel energy matrix.

The method of the present invention is mainly applicable to a massive MIMO system in which a BS side is equipped with a large-scale antenna array to simultaneously serve a plurality of users. A specific implementation process of the method for acquiring the beam domain statistical channel information of the present invention is described in detail below with specific instances of a communication system. It should be noted that the method of the present invention is not only applicable to specific system models given in the following examples, but also applicable to system models with other configurations.

1. System Configuration

A large-scale flat block fading MIMO system is considered, and it is assumed that different mobile terminal channels in the system remain unchanged within T symbol intervals. The massive MIMO system is composed of one BS and K mobile terminals. The BS is equipped with a large-scale uniform planar array antenna, where the numbers of antennas in each row and each column are $M_{h'}$ and $M_{v'}$ respectively, and a total number of transmitting antennas is $M_t = M_h M_{v'}$. For simplicity, it is assumed that each user is equipped with $M_k$ antennas. A system time resource is divided into several time slots, each time slot consists of $N_h$ time blocks, and each time block has T symbol intervals. The massive MIMO system considered in this embodiment works in time division duplexing (TDD) mode. For simplicity, it is assumed that only uplink channel training and downlink transmission phases exist, and downlink transmission includes sending of precoding domain pilot and data signals. In each time slot, the BS receives user uplink pilot signals only in the first time block, and performs transmission of the precoding domain pilot and data signals from the second to the $N_b$th time blocks. The length of an uplink training sequence is the length of the block, namely, the T symbol intervals. For a frequency division duplexing (FDD) mode, the uplink channel training phase may be replaced with a downlink channel feedback phase, and the downlink transmission phase remains unchanged. Specifically, in the first block, downlink omnidirectional pilot signals are transmitted and feedback from the mobile terminals is received.

2. Refined Beam Domain a Priori Statistical Channel Model

A refined beam domain a priori statistical model based on the refined sampling steering vector matrix is elaborated below. The number of steering vectors in the conventional beam domain channel model is identical with the number of the antennas. The refined beam domain statistical model described in the present invention aims to introduce more steering vectors than the antennas into the channel model to better describe channel statistical properties. Refined factors in the horizontal and vertical dimensions of the BS are respectively defined as $N_h$ and $N_v$, which are integers greater than 1 or fractions. Let $M_h = N_h M_{h'}$ and $M_b = N_v M_{v'}$ respectively denote the numbers of refined sampling steering vectors in the horizontal and vertical dimensions. Further, the following equations are defined:

$$v_h(v^n) = M_{h'}^{-1/2}[1\, e^{-j2\pi(M_{h'}-1)v_n}] \tag{1},$$

and $$v_v(u_m) = M_{v'}^{-1/2}[1\, e^{j2\pi u_m} \ldots e^{-j2\pi(M_{v'}-1)u_m}] \tag{2}$$

Then, steering vector matrices in the horizontal and vertical dimensions are respectively denoted as follows:

$$V_{M_h} = [v_h(v_1)^T v_h(v_2)^T \ldots v_h(v_{M_h})^T] \in \mathbb{C}^{M_K \times M_h} \tag{3},$$

and $$V_{M_v} = [v_v(u_1)^T v_v(u_2)^T \ldots v_v(u_{M_v})^T] \in \mathbb{C}^{M_V \times M_h} \tag{4},$$

where $v_n = (n-1)/M_h$ and $u_m = (m-1)/M_v$. Let $V_M^H \otimes V_M^H$ denote the refined sampling steering vector matrix at the BS side. Similarly, a user-side refined factor is defined as $N_k$. Let $M_k = N_k\, M_k$, which denotes the number of user-side refined sampling steering vectors. Further, the following equation is defined:

$$a_r(u_i) = M_{k'}^{-1/2}[1 e^{-j2\pi u_i} \ldots e^{-j2\pi(M_{k'}-1)u_i}] \tag{5}.$$

Then, a refined sampling steering vector matrix at the user side is defined as follows:

$$U_k = [a_r(u_1) a_r(u_2)^T \ldots a_r(U_{M_k})^T] \in \mathbb{C}^{M_k \times M_k} \tag{6}.$$

$V_{M_t}^H$ and $U_k$ in the foregoing equation are respectively corresponding to a planar array steering vector matrix at the BS side and a linear array steering vector matrix at the user side. It should be noted that, the method of the present invention is not only applicable to a large-scale uniform planar array antenna, but also applicable to antennas in other forms, such as a cylindrical array antenna, and a planar array antenna of which the array elements are polarized antennas. When the antenna array at the BS side or the user side is changed, $V_{M_1}^H$ or $U_k$ is changed into a steering vector matrix of a corresponding array. Let $H_{k,m,n}$ denote a channel of the kth user in the mth time slot and the nth block, and then a refined beam domain a priori statistical channel model of the considered massive MIMO system may be defined as follows:

$$H_{k,m,n} = U_k G_{k,m,n} V_{M_t}^H \quad (7),$$

where $G_{k,m,n} = (M_k \odot W_{k,m,n})$, which denotes a refined beam domain channel matrix of the kth user in the mth time slot and the nth block; $M_k$ denotes a refined beam domain channel amplitude matrix of the kth user; and W denotes a random matrix, composed of independent identically distributed complex Gaussian random variables, of the kth user in the mth time slot and the nth block. Compared to a conventional DFT matrix-based beam domain a priori statistical channel model, such a refined beam domain statistical model has more statistical characteristic directions and thus can more accurately represent an actual physical channel model. A refined beam domain channel energy matrix $\Omega_k$ of the massive MIMO system is defined as $\Omega_k = M_k \odot M_k$, and this beam domain energy matrix often has a sparse characteristic.

3. Acquisition Method of a Priori Statistical Channel Information of the Refined Beam Domain Channel Model For the considered massive MIMO system working in TDD mode, due to the reciprocity of uplink and downlink channels, the obtained uplink channel statistical information can be directly used as downlink channel statistical information. For the FDD system, instantaneous reciprocity between channels does not exist, and the user side acquires the downlink statistical channel information and feeds it back to the BS. A method for acquiring refined beam domain a priori statistical channel information is given below. It is assumed that $X_k$ is a pilot matrix of the kth user, which can be used for acquiring the a priori statistical channel information. Pilot matrices between users are orthogonal, while pilots between different antennas are not required to be orthogonal. That is, $X_k$ need not be a unitary matrix. Let Ye denote a pilot signal received by the BS in the mth time slot and the first block, and then the following equation is obtained:

$$Y_{m,1} = \sum_k H_{k,m,1}^T X_k + Z_{m,1} = \sum_k V_{M_t}^* G_{k,m,1}^T U_k^T X_k + Z_{m,1}. \quad (8)$$

Further, the following equation is obtained:

$$Y_{m,1}^T = \sum_k X_k H_{k,m,1} + Z_{m,1}^T = \sum_k X_k^T U_k G_{k,m,1} V_{M_t}^H + Z_{m,1}^T, \quad (9)$$

where the superscript T indicates transpose, the superscript * indicates conjugate, and the superscript H indicates conjugate transpose; and $Z_{m,1}$ is a random matrix composed of independent identically distributed complex Gaussian random variables. Because the pilot matrices of the users are orthogonal, $Y_{m,1}^T$ is multiplied by $U_k^H X_k^*$ on the left and by $V_{M_t}$ on the right, to obtain the following equation:

$$U_k^H X_k^* Y_{m,1}^T V_{M_t} = U_k^H X_k^* X_k^T U_k (M_k \odot W_{k,m,1}) V_{M_t}^H V_{M_t} + U_k^H Z_{m,1}^T X_k^H V_{M_t}, \quad (10)$$

where $\odot$ denotes the Hadmard product. Let $N = E\{Z_{m,1}^T \odot Z_{H,1}^H\}$, and then the following equation is further obtained:

$$E\{U_k^H X_k^* Y_{m,1}^T V_{M_t} \odot (U_k^H X_k^* Y_{m,1}^T V_{M_t})^*\} = \quad (11)$$
$$(U_k^H X_k^* X_k^T U_k \odot (U_k^H X_k^* X_k^T U_k)^*) \Omega_k (V_{M_t}^H V_{M_t} \odot (V_{M_t}^H V_{M_t})^*) +$$
$$(U_k^H X_k^* \odot (U_k^H X_k^*)^*) N (V_{M_t} \odot (V_{M_t})^*)$$

Let the matrix $T_{kr}$ denote $U_k^H X_k^* X_k^T U_k \odot (U_k^H X_k^* X_k^T U_k)^*$, the matrix T denote $V_{M_t}^H V_{M_t} \odot (V_{M_t}^H V_{M_t})^*$, the matrix $O_{kr}$ denote $(U_k^H X_k^* \odot (U_k^H X_k^*)^*$ and the matrix $O_{kr}$ denote $V_{M_t} \odot (V_{M_t})^*$, and then the following equation can be obtained:

$$E\{U_k^H X_k^* Y_{m,1}^T V_{M_t} \odot (U_k^H X_k^* Y_{m,1}^T V_{M_t})^*\} = T_{kr} \Omega_k T_t + O_{kr} N O_t. \quad (12)$$

In a case where a noise variance matrix N is known, $O_{kr} N O_t L$ is a known matrix. For simplicity, let $\Phi_k \in \mathbb{C}^{M_k + N M_t}$, $N + N_k N_v$, and then:

$$\Phi_k = E\{U_k^H X_k^* Y_{m,1}^T V_{M_t} \odot (U_k^H X_k^* Y_{m,1}^T V_{M_t})^*\}. \quad (13)$$

Since only the sample average can be obtained in the actual system, $\Phi_k$ is redefined as a refined beam domain sample statistical matrix:

$$\Phi_k = \frac{1}{M} \sum_{m=1}^{M} U_k^H X_k^* Y_{m,1}^T V_{M_t} \odot (U_k^H X_k^* Y_{m,1}^T V_{M_t})^*, \quad (14)$$

where M denotes the number of samples. Equation (14) can be expressed in terms of elements as follows:

$$[\Phi_k]_{ij} = \frac{1}{M} \sum_{m=1}^{M} |[U_k^H X_k^* Y_{m,1}^T V_{M_t}]_{ij}|^2. \quad (15)$$

By using $\Phi_k$, equation (11) can be changed into:

$$\Phi_k = T_{kr} \Omega_k T_t + O_{kr} N O_t \quad (16).$$

In the foregoing equation, $T_{kr}$ and $T_t$ are known matrices, and $O_{kr} N O_t$ is also a known matrix. Therefore, the only unknown parameter matrix on the right side of the equal sign of the foregoing equation is the refined beam domain channel energy matrix $\Omega_k$. Therefore, the acquisition of the channel energy matrix $\Omega_k$ is based on the sample statistical matrix $\Omega_k$ and the determined matrices $T_{kr}$, $T_t$, and $O_{kr} N O_t$. $T_{kr} \Omega_k T_t + O_{kr} N O_t$ is referred to as a function matrix of the channel energy matrix. Equation (16) belongs to the category of parameter matrix estimation. To solve $\Omega_k$, an optimization problem may be established according to equation (16), and then is solved by means of gradient descent, conjugate gradient, Newton iteration, or an iterative formula obtained from KKT conditions. To illustrate this problem more clearly, a specific estimation method is given below. In order to estimate the channel energy matrix $\Omega_k$ or the channel amplitude matrix $M_k$, a target function is defined as follows by using the refined beam domain sample statistical matrix $\Phi_i$, and KL divergence of the function matrix $T_{kr}\Omega_j T_t+O_{kr}NO_t$ of the channel energy matrix:

$$g(M_k) = -\sum_{ij}[\Phi_k]_{ij}\log[T_{kr}\Omega_k T_t + O_{kr}NO_t]_{ij} + \sum_{ij}[T_{kr}\Omega_k T_t]_{ij} + c_0. \quad (17)$$

In the foregoing equation, co is a constant not related to $M_k$. In order to obtain $M_k$ with the minimum KL divergence by means of optimization, first, the derivative is calculated for the target function, and the derivative of the second half of equation (17) is:

$$\frac{\partial \sum_{ij}[T_{kr}\Omega_k T_t]_{ij}}{\partial M_k} = (T_t J T_{kr})^T \odot M_k, \quad (18)$$

where J is an all-ones matrix. The derivative calculation in the first half part is slightly complicated:

$$\frac{\partial \sum_{ij}[\Phi_k]_{ij}\log[T_{kr}\Omega_k T_t + O_{kr}NO_t]_{ij}}{\partial M_k} = (T_{kt}Q^t T_t)^t \odot M_k, \quad (19)$$

where $Q \in \mathbb{C}^{M_k/NM_t}$ $$[Q]_{ij} = \frac{[\Phi_k]_{ij}}{[T_{kr}\Omega_k T_t + O_{kr}NO_t]_{ij}}. \quad (20)$$

To sum up, the derivative calculation for $g(M_k)$ is as follows:

$$\frac{\partial g(M_k)}{\partial M_k} = (T_t J T_{kr})^T \odot M_k - (T_t Q^T T_{kr})^T \odot M_k, \quad (21)$$

Let $g(M_k)=0$, and then the necessary condition for an optimal point can be obtained as follows:

$$(T_t J T_{kr})^T \odot M_k - (T_t Q^T T_{kr})^T \odot M_k = 0 \quad (22),$$

Further, the following equation is obtained:

$$(T_t J T_{kr})^T \odot M_k = (T_t Q^T T_{kr})^T \odot M_k \quad (23),$$

Based on the necessary condition, an iterative formula may be constructed as follows:

$$M_k = \frac{1}{2}M_k + A_k \odot M_k \quad (24)$$

where $$[A_k]_{ij} = \frac{\left[(T_t Q^T T_{kr})^T\right]_{ij}}{2\left[(T_t J T_{kr})^T\right]_{ij}}, \quad (25)$$

A refined sampling beam domain channel amplitude matrix can be obtained according to the provided iterative formula. To sum up, steps of acquiring refined beam domain statistical channel information may be summarized as follows:

step 1: receiving pilot signals $X_k$ sent by the different mobile terminals;

step 2: respectively multiplying the received pilot signals $Y_{m,1}$ and local pilot signals $X_k$ of the users, to obtain $X_k^* Y_{m,1}^T$;

step 3: transforming the multiplied pilot signals to a refined beam domain $U_k^H X_k^* Y_{m,1}^T V_{M_t}$ by conversion; and step 4: acquiring the refined beam domain a priori statistical channel information of the mobile terminals by using the refined beam domain sampling statistics $$\Phi_k = \frac{1}{M}\sum_{m=1}^{M} U_k^H X_k^* Y_{m,1}^i V_{M_t} \odot \left(U_k^H X_k^* Y_{m,1}^T V_{M_t}\right)^*.$$

The method for acquiring the refined beam domain a priori statistical channel information of the mobile terminals by using the refined beam domain sampling statistics $\Phi_k$ in step 4 may be further detailed as follows:

step1: calculating $T_t = V_{M_t}^H V_{M_t} \odot (V_{M_t}^H V_{M_t})$, $T_{kr}=U_k^H X_k^* X_k^T U_k \odot (U_k^H X_k^* X_k^T U_k)^*$, $O_{kr}=U_k^H X_k^* \odot (U_k^H X_k^*)^*$ and $O_t = V_{M_t} \odot (V_{M_t})^*$;

step 2: initializing $M_k$; and step 3: iteratively calculating $$M_k = \frac{1}{2}M_k + A_k \odot M_k,$$

where $A_k$ needs to be updated as follows with $M_k$:

$$[A_k]_{ij} = \frac{\left[(T_t Q^T T_{kr})^T\right]_{ij}}{2\left[(T_t J T_{kr})^T\right]_{ij}},$$

$$[Q]_{ij} = \frac{[\Phi_k]_{ij}}{[T_{kr}\Omega_k T_t + O_{kr}NO_t]_{ij}},$$

$$\Omega_k = M_k \odot M_k$$

The method for acquiring the refined beam domain a priori statistical channel information by using the pilot signals is described above. In an actual system, the instantaneous channel information may also be first acquired, and then the refined beam domain a priori statistical channel information is acquired by using the instantaneous channel information. The following gives a method for acquiring the refined beam domain statistical channel information $\Omega_k$ in the case of known channel information. $H_{k,m,l}$ is multiplied by $U_k^H$ on the left and by $V_{M_t}$ on the right, to obtain the following equation:

$$U_k^H H_{k,m,1} V_{M_t} = U_k^H U_k (M_k \odot W_{k,m,1}) V_{M_t}^H V_{M_t}. \quad (26)$$

Further, the following equation is obtained:

$$E\{U_k^H H_{k,m,1} V_{M_t} \odot (U_k^H H_{k,m,1} V_{M_t})^*\} = \quad (27)$$
$$(U_k^H U_k \odot (U_k^H U_k)^*)\Omega_k (V_{M_t}^H V_{M_t} \odot (V_{M_t}^H V_{M_t})^*).$$

In this case, the refined beam domain sample statistical matrix $\Phi_k \odot \mathbb{C}^{M_k \times NM_t}$ is changed into:

$$\Phi_k = \frac{1}{M}\sum_{m=1}^{M} U_k^H H_{k,m,l} V_{m_t} \odot \left(U_k^H H_{k,m,l} V_{M_t}\right)^*; \quad (28)$$

or is expressed in terms of elements as follows:

$$[\Phi_k]_{ij} = \frac{1}{M}\sum_{m=1}^{M}\left|\left[U_k^H H_{k,m,l} V_{M_t}\right]_{ij}\right|^2. \quad (29)$$

Further, the following equation can be obtained:

$$\Phi_k = T_{kr}\Omega_k T_t \quad (30).$$

In this case, $T_{kr}$ is changed to $T_{kr} = U_k^H U_k \odot (U_k^H U_k)^*$; and $\Phi_k$ and the KL divergence function of the function matrix $T_{kr}\Omega_k T_t$ of the channel energy matrix is simplified as follows:

$$g(M_k) = -\sum_{ij}[\Phi_k]_{ij}\log[T_{kr}\Omega_k T_t]_{ij} + \sum_{ij}[T_{kr}\Omega_k T_t]_{ij} + c_0. \quad (31)$$

In the foregoing equation, co is a constant not related to $M_k$. Similarly, in order to obtain $M_k$ with the minimum KL divergence by means of optimization, first, the derivative is calculated for the target function, and the derivative of the second half of equation (31) is changed into:

$$\frac{\partial \sum_{ij}[T_{kr}\Omega_k T_t]_{ij}}{\partial M_k} = (T_t J T_{kr})^T \odot M_k, \quad (32)$$

where J is an all-ones matrix. The derivative calculation in the first half part is changed into:

$$\frac{\partial \sum_{ij}[\Phi_k]_{ij}\log[T_{kr}\Omega_k T_t]_{ij}}{\partial M_k} = (T_t Q^T T_{kr})^T \odot M_k, \quad (33)$$

where $Q \in \mathbb{C}^{M_k \times NM_t}$ $$[Q]_{ij} = \frac{[\Phi_k]_{ij}}{[T_{kr}\Omega_k T_{kt}]_{ij}} \circ. \quad (34)$$

To sum up, the derivative calculation for $g(M_k)$ is as follows:

$$\frac{\partial g(M_k)}{\partial M_k} = (T_t J T_{kr})^T M_k - (T_t Q^T T_{kr})^T \odot M_k. \quad (35)$$

Let $g(M_k)=0$, and then the necessary condition for an optimal point can be obtained as follows:

$$(T_t J T_{kr})^T M_k - (T_t Q^T T_{kr})^T \odot M_k = 0 \quad (36).$$

Further, the following equation is obtained:

$$(T_t J T_{kr})^T M_k = (T_t Q^T T_{kr})^T \odot M_k \quad (37).$$

Based on the necessary condition, an iterative formula is constructed as follows:

$$M_k = \frac{1}{2}M_k + A_k \odot M_k \quad (38)$$

where $$[A_k]_{ij} = \frac{\left[(T_t Q^T T_{kr})^T\right]_{ij}}{2\left[(T_t J T_{kr})^T\right]_{ij}}.$$

To sum up, steps of acquiring the refined beam domain statistical channel information in the case of known channel information may be summarized as follows:

step 1: acquiring a channel matrix $H_{k,m,1}$;

step 2: transforming the channel matrix to the refined beam domain $U_k^H H_{k,m,1} V_{M_t}$ by conversion; and step 3: acquiring the refined beam domain a priori statistical channel information of the mobile terminals by using the refined beam domain sampling statistics $$\Phi_k = \frac{1}{M}\sum_{m=1}^{M} U_k^H H_{k,m,1} V_{M_t} \odot \left(U_k^H H_{k,m,1} V_{M_t}\right)^*.$$

The method for acquiring the refined beam domain a priori statistical channel information of the mobile terminals by using the refined beam domain sampling statistics $\Phi_k$ in step 3 may be further detailed as follows:

step 1: calculating $[T_k]_{ij} = |[V_{M_t}^H V_{M_t}]_{ij}|^2$ according to $Y_{M_t}$;

step 2: initializing $M_k$; and step 3: iteratively calculating $$M_k = \frac{1}{2}M_k + A_k \odot M_k,$$

where $A_k$ needs to be updated as follows with $M_k$:

$$[A_k]_{ij} = \frac{\left[(T_t Q^T T_{kr})^T\right]_{ij}}{2\left[(T_t J T_{kr})^T\right]_{ij}},$$

$$[Q]_{ij} = \frac{[\Phi_k]_{ij}}{[T_{kr}\Omega_k T_{kt}]_{ij}},$$

$$\Omega_k = M_k \odot M_k$$

4. Refined Beam Domain a Posteriori Statistical Channel Model

After the refined beam domain a priori statistical channel information is obtained based on the foregoing method, refined beam domain a posteriori statistical channel information can be further obtained by using the same. First, the pilot signal received in the (m−1)th time slot and the first block can still be expressed as follows:

$$Y_{m-1,1}^T = \sum_k X_k H_{k,m-1,1} + Z_{m-1,1}^T = \sum_k X_k^T U_k G_{k,m-1,1} V_{M_t}^H + Z_{m-1,1}^T. \quad (39)$$

By vectorization of $Y_{m-1,1}^T$ the following equation can be obtained:

$$vec(Y_{m-1,1}^T) = \sum_k (V_{M_t}^T \otimes X_k^T U_k) vec(G_{k,m-1,1}) + vec(Z_{m-1,1}^T). \quad (40)$$

Because pilots of different users are orthogonal, the minimum mean square error of a refined beam domain channel vector vec($G_{k,m-1,1}$) can be estimated as follows:

$$vec(\hat{G}_{k,m-1,1}) = R_{g_k}(V_{M_t}^T \otimes X_k^T U_k)^H \quad (41)$$
$$((V_M^T \otimes X_k^T U_k)R_{g_k}(V_{M_t}^T \otimes X_k^T U_k)^H + \sigma_z^2 I)vec(Y_{m-1,1}^T),$$

where $R_{g_k}$=diag(vec($\Omega_k$)), which is a channel covariance matrix of the refined beam domain, and $\sigma_z^2$ is the element variance of a noise matrix $Z_{m-1,1}^T$.

Assuming that the channel information obtained in the (m−1)th time slot and the first time block is used for transmission in the mth time slot, in order to describe the time-correlation characteristics of the massive MIMO, the first-order Gaussian Markov model is adopted to describe a time-correlation model. In this model, a refined beam domain channel in the mth time slot and the nth time block may be expressed as follows:

$$G_{k,m,n} = \alpha_{k,m}(N_b + n - 1)G_{k,m-1,1} + \sqrt{1 - \alpha_{k,m}^2(N_b + n - 1)}(M_k \odot W_{k,m,n}) \quad (42)$$

where $\alpha_{k,m}(N_b+n-1)$ is a correlation factor function of channels $G_{k,m,n}$ and $G_{k,m-1,1}$ which is a time-correlation factor related to the speed of the user. There are many methods of acquiring the correlation factor $\alpha_{k,m}$ and it is assumed herein that the correlation factor is known. In practice, an experience correlation factor for channel samples may be used; or a calculation method of the correlation factor $\alpha_{k,m}$ based on the Jakes autocorrelation model that is commonly used in the documents may also be used, namely, $\alpha_{k,m}(n)=J_0(2\pi v_k f_c n T\tau/c)$, where $J_0(*)$ denotes the first-class zero-order Bessel function, $\tau$ denotes the time corresponding to a time interval, $v_k$ denotes the speed of the kth user, $f_c$ denotes a carrier frequency, and c is the velocity of light. The model in equation (42) is used for channel prediction. In this embodiment, in consideration of implementation complexity of the system, precoding is performed in the whole time slot m. For simplicity, not considering a channel estimation error, it is assumed that accurate channel information of the refined beam domain channel matrix $G_{k,m-1,1}$ can be obtained. Then, the following a posteriori statistical information of the refined beam channel in the time slot m can be obtained:

$$G_{k,m} = \beta_{k,m} G_{k,m\ 1,1} + \sqrt{1 - \beta_{k,m}^2}(M_k \odot W_{k,m}), \quad (43)$$

where $\beta_{k,m}$ and the channel in the whole time slot m are relevant to the correlation factor $\alpha_{k,m}$ of $H_{k,m-1,1}$. A feasible method is to calculate a mean square root of all correlation factors $\alpha_{k,m}$ in the time slots. Further, the following refined beam domain a posteriori statistical channel model in the time slot m can be obtained:

$$H_{k,m} = \beta_{k,m} H_{k,m-1,1} + \sqrt{1 - \beta_{k,m}^2} U_k(M_k \odot W_{k,m}) V_{M_t}^H. \quad (44)$$

When the channel estimation error is considered, the channel a posteriori statistical model in equation (44) can be obtained necessarily according to the channel estimation error, the time-correlation model, and the a priori statistical model. For ease of calculation in the refined beam domain, $H_{k,m-1,1}$ is denoted as $H_{k,m-1,1}=U_k GH_{k,m-1,1} V_{M_t}^H$, and then a refined a posteriori statistical model can be further expressed as follows:

$$H_{k,m} = \beta_{k,m} U_k G_{k,m-1,1} V_{M_t}^H + \sqrt{1 - \beta_{k,m}^2} U_k(M_k \odot W_{k,m}) V_{M_t}^H, \quad (45)$$

where $\beta_{k,m} G_{k,m-1,1}$ is a refined beam domain a posteriori mean, and the variance of $\sqrt{1-\beta_{k,m}^2}(M_k \odot W_{k,m})$ is a refined beam domain a posteriori variance. For the FDD system, $G_{k,m-1,1}$ can be obtained by means of feedback, and based on this, the refined beam domain a posteriori statistical information can be obtained with reference to the refined beam domain a priori statistical information.

5. Implementation Effect

In order to make those skilled in the art better understand the solution of the present invention, a comparison in performance between a covariance matrix estimation based on the refined beam domain model in this embodiment and a sample covariance matrix is made below under a specific system configuration.

Figure 4:
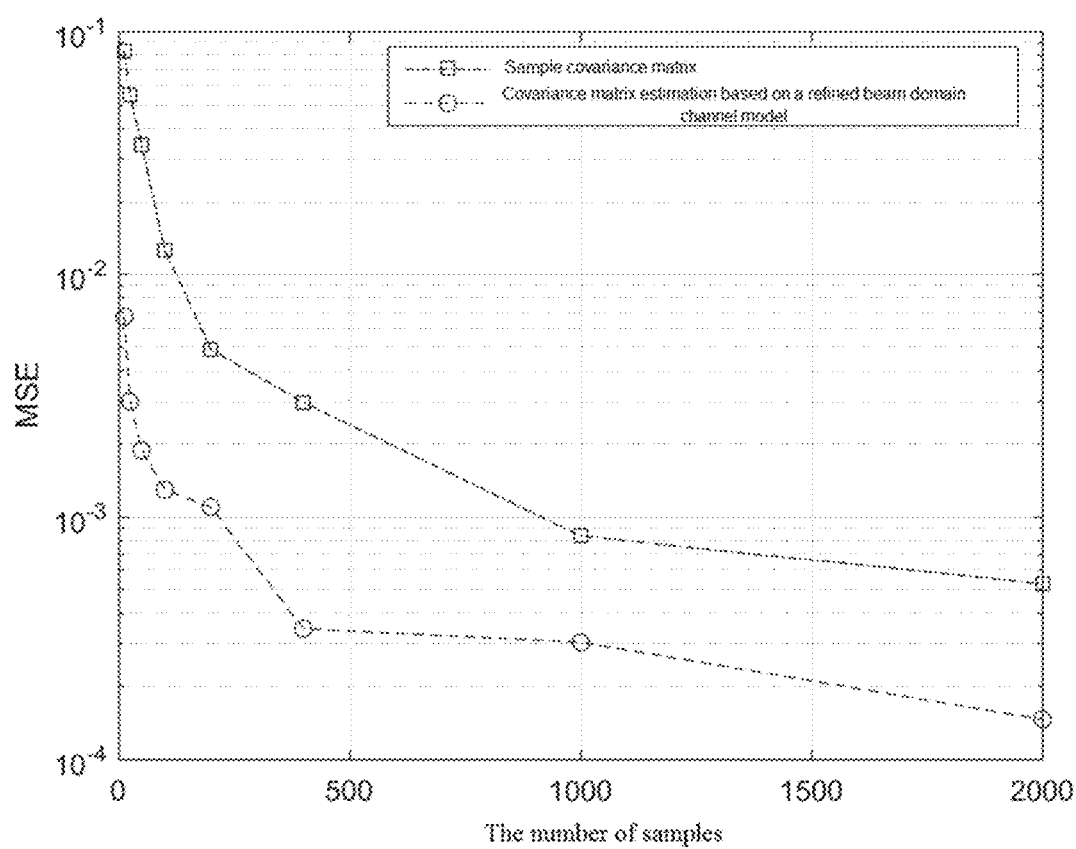
FIG. 4 is a result diagram of comparison in MSE performance between a covariance matrix estimated based on a beam domain channel model and a sample covariance matrix.

A massive MIMO system in which $M_t$=64 is considered, where BS antennas are configured as $M_h'$=8, $M_v'$=8, and a single antenna is configured at the user side. A channel energy matrix $\Omega_k$ is randomly generated, and based on this, 2000 channel samples are generated according to a refined beam domain channel model. By means of the method for acquiring the refined beam domain statistical channel information in the case of known channel information that is disclosed in the present invention, the channel energy matrix $\Omega_k$ is estimated and then a covariance matrix estimation is calculated. FIG. 4 shows a comparison in MSE performance between the covariance matrix estimated by the method of the present invention and a sample covariance matrix. It can be seen from FIG. 4 that the covariance matrix estimation obtained by using the acquisition method of the refined beam domain a priori statistical channel information disclosed in the present invention is significantly superior to the sample covariance matrix in terms of the MSE performance.

Based on the same invention concept, an embodiment of the present invention further discloses a computing device, which includes a memory, a processor, and a computer program stored in the memory and running on the processor. When loaded to the processor, the computer program implements the foregoing method for acquiring the massive MIMO beam domain a priori statistical channel information or the foregoing method for acquiring the massive MIMO beam domain a posteriori statistical channel information.

In a specific implementation, the device includes a processor, a communication bus, a memory, and a communication interface. The processor may be a general-purpose central processing unit (CPU), a microprocessor, an application-specific integrated circuit (ASIC), or one or more integrated circuits for controlling the program execution of the solution of the present invention. The communication bus may include a path which transmits information between the above components. The communication interface is any transceiver-type device for communication with another device or communication network. The memory may be a read-only memory (ROM) or other types of static storage devices that can store static information and instructions, or a random access memory (RAM) or other types of dynamic storage devices that can store information and instructions; and may also be an electrically erasable programmable read-only memory (EEPROM), CD-ROM or other optical disk storage, a disk storage medium or other magnetic storage devices, or any other medium that can be used to carry or store desired program code in the form of instructions or data structures and can be accessed by the computer. However, the present invention is not limited thereto. The memory may be stand-alone and connected to the processor via the bus. The memory may also be integrated with the processor.

The memory is used to store the application program code for executing the solution of the present invention and the processor controls the execution. The processor is used to execute the application program code stored in the memory, thereby implementing the information acquisition methods provided in the foregoing embodiments. The processor may include one or more CPUs, or may also include multiple processors, where each of the processors may be a single-core processor or a multi-core processor. The processor herein may refer to one or more devices, circuits, and/or processing cores for processing data (e.g., computer program instructions).

Based on the same invention concept, an embodiment of the present invention further discloses a massive MIMO communication system, which includes a BS and a plurality of user terminals. The BS is used for: receiving pilot signals sent by the different user terminals; respectively multiplying the received pilot signals and pre-stored pilot signals of the users; transforming the multiplied pilot signals to a refined beam domain by conversion by means of multiplication by a refined sampling steering vector matrix, where the number of steering vectors in the refined sampling steering vector matrix is greater than the number of BS antennas; and acquiring refined beam domain a priori statistical channel information of the user terminals by using refined beam domain sampling statistics.

Based on the same invention concept, an embodiment of the present invention further discloses a massive MIMO communication system, which includes a BS and a plurality of user terminals. The BS is used for: acquiring channel information of the different user terminals; transforming the channel information of the user terminals to a refined beam domain by conversion by means of multiplication by a refined sampling steering vector matrix, where the number of steering vectors in the refined sampling steering vector matrix is greater than the number of BS antennas; and acquiring refined beam domain a priori statistical channel information of the user terminals by using refined beam domain sampling statistics.

Based on the same invention concept, an embodiment of the present invention further discloses a massive MIMO communication system, which includes a BS and a plurality of user terminals. The BS is used for: acquiring refined beam domain a priori statistical channel information of the different user terminals before the current time slot by using the method for acquiring the massive MIMO beam domain a priori statistical channel information; acquiring pilot signals sent by the user terminals at the current time slot; estimating a refined beam domain channel matrix by using the received pilot signals; and acquiring refined beam domain a posteriori statistical channel information of the user terminals according to the refined beam domain a priori statistical channel information and correlation factors between channels.

Based on the same invention concept, an embodiment of the present invention further discloses a massive MIMO communication system, which includes a BS and a plurality of user terminals. The BS is disposed with the foregoing computing device.

In the embodiments provided in the present application, it should be understood that the disclosed method can be implemented in other ways without departing from the spirit and scope of the present application. The current embodiments are merely exemplary examples and should not be used as limitations, and the specific given content should not limit the purpose of the present application. For example, some features may be ignored or not implemented. The content not specified in the present application belongs to the prior art.

The technical means disclosed in the solution of the present invention are not limited to the technical means disclosed in the above embodiments, but also include technical solutions composed of any combination of the above technical features. It should be noted that, several improvements and modifications may be made by those of ordinary skill in the art without departing from the principle of the present invention, and these improvements and modifications should also be construed as falling within the protection scope of the present invention.

What is claimed is:

1. A method for acquiring massive MIMO beam domain a priori statistical channel information, comprising the following steps:
   receiving pilot signals sent by different user terminals;
   respectively multiplying the received pilot signals and pre-stored pilot signals of different users;
   transforming the multiplied pilot signals to a refined beam domain by conversion by means of a refined sampling steering vector matrix, wherein the number of steering vectors in the refined sampling steering vector matrix is greater than the number of corresponding antennas; and
   acquiring refined beam domain a priori statistical channel information of the user terminals by using refined beam domain sampling statistics.

2. The method for acquiring massive MIMO beam domain a priori statistical channel information according to claim 1, wherein the multiplied pilot signals are transferred to the refined beam domain by conversion by means of premultiplication by a conjugate matrix of the refined sampling steering vector matrix at the sending side and postmultiplication by a conjugate matrix of the refined sampling steering vector matrix at the receiving side.

3. The method for acquiring massive MIMO beam domain a priori statistical channel information according to claim 1, wherein the user terminals send the pilot signals on the same time-frequency resource, and the pilot signals of the different user terminals are mutually orthogonal.

4. The method for acquiring massive MIMO beam domain a priori statistical channel information according to claim 1, wherein the step of acquiring the refined beam domain a priori statistical channel information of the user terminals by using the refined beam domain sampling statistics is specifically: solving a channel energy matrix by using an equation regarding the refined beam domain sampling statistics and a function matrix of the channel energy matrix, wherein only the channel energy matrix or a channel amplitude matrix is an unknown matrix in the equation, and other matrices are known matrices.

5. A method for acquiring massive MIMO beam domain a posteriori statistical channel information, comprising the following steps:
   acquiring refined beam domain a priori statistical channel information of user terminals before a current time slot by using the method for acquiring the massive MIMO beam domain a priori statistical channel information according to claim 1;

acquiring pilot signals sent by the user terminals at the current time slot; and estimating a refined beam domain channel matrix by using the received pilot signals, and acquiring refined beam domain a posteriori statistical channel information of the user terminals according to the refined beam domain a priori statistical channel information and correlation factors between channels.

6. The method for acquiring massive MIMO beam domain a posteriori statistical channel information according to claim 5, wherein the refined beam domain a posteriori statistical channel information comprises a refined beam domain a posteriori mean and a refined beam domain a posteriori variance.

7. A computing device, comprising a memory, a processor, and a computer program stored in the memory and running on the processor, wherein when loaded to the processor, the computer program implements the method for acquiring the massive MIMO beam domain a posteriori statistical channel information according to claim 5.

8. A computing device, comprising a memory, a processor, and a computer program stored in the memory and running on the processor, wherein when loaded to the processor, the computer program implements the method for acquiring the massive MIMO beam domain a priori statistical channel information according to claim 1.

9. A massive MIMO communication system, comprising a base station (BS) and a plurality of user terminals, wherein the BS is used for:

acquiring refined beam domain a priori statistical channel information of the user terminals before a current time slot by using the method for acquiring the massive MIMO beam domain a priori statistical channel information according to claim 1;

acquiring pilot signals sent by the user terminals at the current time slot; and estimating a refined beam domain channel matrix by using the received pilot signals, and acquiring refined beam domain a posteriori statistical channel information of the user terminals according to the refined beam domain a priori statistical channel information and correlation factors between channels.

10. A massive MIMO communication system, comprising a base station (BS) and a plurality of user terminals, wherein the BS is disposed with the computing device according to claim 8.

11. A method for acquiring massive MIMO beam domain a priori statistical channel information, comprising the following steps:

acquiring channel information of different user terminals;

transforming the channel information of the user terminals to a refined beam domain by conversion by means of a refined sampling steering vector matrix, wherein the number of steering vectors in the refined sampling steering vector matrix is greater than the number of corresponding antennas; and acquiring refined beam domain a priori statistical channel information of the user terminals by using refined beam domain sampling statistics.

12. The method for acquiring massive MIMO beam domain a priori statistical channel information according to claim 11, wherein the channel information is transferred to the refined beam domain by conversion by means of pre-multiplication by a conjugate matrix of the refined sampling steering vector matrix at the sending side and postmultiplication by a conjugate matrix of the refined sampling steering vector matrix at the receiving side.

13. The method for acquiring massive MIMO beam domain a priori statistical channel information according to claim 11, wherein the step of acquiring the refined beam domain a priori statistical channel information of the user terminals by using the refined beam domain sampling statistics is specifically: solving a channel energy matrix by using an equation regarding the refined beam domain sampling statistics and a function matrix of the channel energy matrix, wherein only the channel energy matrix or a channel amplitude matrix is an unknown matrix in the equation, and other matrices are known matrices.

14. A massive MIMO communication system, comprising a base station (BS) and a plurality of user terminals, wherein the BS is used for:

receiving pilot signals sent by the different user terminals; respectively multiplying the received pilot signals and pre-stored pilot signals of the users; transforming the multiplied pilot signals to a refined beam domain by conversion by means of multiplication by a refined sampling steering vector matrix, wherein the number of steering vectors in the refined sampling steering vector matrix is greater than the number of BS antennas; and acquiring refined beam domain a priori statistical channel information of the user terminals by using refined beam domain sampling statistics; or acquiring channel information of the different user terminals; transforming the channel information of the user terminals to a refined beam domain by conversion by means of multiplication by a refined sampling steering vector matrix, wherein the number of steering vectors in the refined sampling steering vector matrix is greater than the number of BS antennas;

and acquiring refined beam domain a priori statistical channel information of the user terminals by using refined beam domain sampling statistics.

\* \* \* \* \*